(12) United States Patent
Pun (10) Patent No.: US 12,157,270 B2
(45) Date of Patent: Dec. 3, 2024

(54) SUBSTRATE HOLDER WITH LINEAR SLIDE MECHANISM

(71) Applicant: Kateeva, Inc., Newark, CA (US)

(72) Inventor: Digby Pun, San Jose, CA (US)

(73) Assignee: Kateeva, Inc., Newark, CA (US)

( * ) Notice: Subject to any disclaimer, the term of this patent is extended or adjusted under 35 U.S.C. 154(b) by 0 days.

(21) Appl. No.: 17/811,527

(22) Filed: Jul. 8, 2022

(65) Prior Publication Data

US 2023/0062686 A1    Mar. 2, 2023

Related U.S. Application Data

(60) Provisional application No. 63/260,905, filed on Sep. 3, 2021, provisional application No. 63/260,669, filed on Aug. 27, 2021.

(51) Int. Cl.
| | |
|---|---|
| *B29C 64/245* | (2017.01) |
| *B29C 64/112* | (2017.01) |
| *B29C 64/227* | (2017.01) |
| B29L 31/34 | (2006.01) |
| B33Y 10/00 | (2015.01) |
| B33Y 30/00 | (2015.01) |

(52) U.S. Cl.
CPC .......... *B29C 64/245* (2017.08); *B29C 64/112* (2017.08); *B29L 2031/3475* (2013.01); *B33Y 10/00* (2014.12); *B33Y 30/00* (2014.12)

(58) Field of Classification Search
CPC ... B29C 64/245; B29C 64/112; B29C 64/227; B33Y 30/00; B41J 11/06; B41J 11/42; B25B 5/062; B25B 5/064; B25B 5/006; B25B 5/02; B25B 5/04; B23K 37/02; B23K 37/04
See application file for complete search history.

(56) References Cited

U.S. PATENT DOCUMENTS

| | | | |
|---|---|---|---|
| 2002/0105688 A1 | 8/2002 | Katagami et al. | |
| 2006/0054774 A1 | 3/2006 | Yassour et al. | |
| 2007/0216892 A1* | 9/2007 | Eidelberg | G03B 27/58 355/75 |
| 2008/0014075 A1 | 1/2008 | Pun et al. | |
| 2014/0230230 A1* | 8/2014 | Gao | B25B 5/006 29/559 |
| 2015/0375389 A1* | 12/2015 | Semann | B23D 47/025 269/21 |
| 2020/0119314 A1* | 4/2020 | Pun | B05C 13/00 |
| 2020/0180329 A1* | 6/2020 | Pun | B41J 11/58 |

FOREIGN PATENT DOCUMENTS

CN        111791607 B        12/2020

\* cited by examiner

*Primary Examiner* — Galen H Hauth
*Assistant Examiner* — Baileigh Kate Darnell
(74) *Attorney, Agent, or Firm* — Hauptman Ham, LLP (57) ABSTRACT

A substrate holder for an inkjet printer is described herein. The substrate holder has a contact member having a contact surface and a carriage surface opposite from the contact surface and a carriage coupled to the carriage surface, the carriage having a direction of motion extending in a first direction. The carriage has a base member and a linear slide mechanism coupling the base member to the contact member, the linear slide mechanism oriented with a direction of linear displacement at an acute angle with the direction of motion in a plane parallel to the contact surface.

20 Claims, 5 Drawing Sheets

SUBSTRATE HOLDER WITH LINEAR SLIDE MECHANISM

CROSS REFERENCE TO RELATED APPLICATIONS

This application claims benefit of U.S. Provisional Patent Application Ser. No. 63/260,669 filed Aug. 27, 2021, and of U.S. Provisional Patent Application Ser. No. 63/260,905 filed Sep. 3, 2021, each of which is entirely incorporated herein by reference.

FIELD

This application for patent relates to a device and methods for aligning substrates for printing processes.

BACKGROUND

Industrial inkjet printers are used to apply materials to large substrates to form devices of all kinds. The substrates can be rigid or flexible, thick or thin, and can be made of an array of materials. The most common types of substrates used in this way are substrates made of various types of glass, which are processed to make electronic displays such as televisions and displays for smart phones.

To form a layer on a substrate using an inkjet printer, the substrate is moved into position to receive material from a printing apparatus that is part of the inkjet printer. Usually, a manipulator moves the substrate into position for processing. Precision in movement of the substrate is useful for ensuring deposition of material in the right location. Vibration and oscillation in substrate holding, which can result from insufficient strength or stiffness of substrate holding parts in comparison with mass of the substrate, can contribute to imprecise positioning of the substrate. There is a need for improved substrate holding in inkjet printers.

SUMMARY

Embodiments described herein provide a substrate holder, comprising a contact member having a contact surface and a carriage surface opposite from the contact surface; and a carriage coupled to the carriage surface, the carriage having a direction of motion extending in a first direction, and comprising a base member; and a linear slide mechanism coupling the base member to the contact member, the linear slide mechanism oriented with a direction of linear displacement at an acute angle with the first direction in a plane parallel to the contact surface.

Other embodiments described herein provide an inkjet printer, comprising a substrate support with a flat support surface; a print support disposed across the support surface; a printhead coupled to the print support; and a substrate holder disposed at a side of the support surface, the substrate holder comprising a contact member having a contact surface and a carriage surface opposite from the contact surface; and a carriage coupled to the carriage surface, the carriage comprising a base member having a longitudinal axis; and a linear slide mechanism coupling the base member to the contact member, the linear slide mechanism oriented with a linear displacement that forms an acute angle with the longitudinal axis in a plane parallel to the contact surface.

Other embodiments described herein provide a method of processing a substrate, the method comprising vacuum coupling a substrate to a contact surface of a contact member of a substrate holder of an inkjet printing system; coupling a carriage surface of the contact member to a carriage of the substrate holder, the carriage having a direction of motion and comprising a base member; and a linear slide mechanism coupling the base member to the contact member, the linear slide mechanism oriented with a linear displacement that forms an acute angle with the direction of motion in a plane parallel to the contact surface; moving the carriage along a linear support to translate the substrate in the direction of motion; and operating the linear slide mechanism to maintain a constant position of the substrate along an axis perpendicular to the direction of motion and to maintain a constant rotational orientation of the substrate.

BRIEF DESCRIPTION OF THE DRAWINGS

Aspects of the subject matter described in this patent application are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

This patent application describes embodiments and examples of one or more inventions. Specific examples of components, values, operations, materials, arrangements, etc., are described below to better explain the subject matter. These are, of course, merely examples and are not intended to be limiting. Other components, values, operations, materials, arrangements, etc., are contemplated. For example, components shown in direct contact herein might not be in direct contact in other embodiments not shown but contemplated within the subject matter, and vice versa. In addition, the description below may repeat reference numerals and/or letters in the various examples. This repetition is for the purpose of simplicity and clarity and does not in itself dictate a particular relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in addition to the orientation depicted in the figures. The apparatus may be otherwise oriented (rotated 90 degrees or at other orientations) and the spatially relative descriptors used herein may likewise be interpreted accordingly. No particular orientation of an apparatus is intended by use of such terms herein.

Displays and monitors for televisions, computer, and other electrical devices include a regular array of materials (pixels), which can be printed on a substrate, and which produce the image displayed on the displays or monitors. Accurately positioning the pixels involves accurate positioning of the substrate for receiving the printed material. Accurate placement of the printed material becomes increasingly difficult as display resolution, as measured in pixels per inch, increases. Pixels in a display device which fall outside of a threshold distance from an expected position of the pixel might not conform to specification. Inoperable pixels in a display device can result in pixels being stuck in an "on" condition, or in an "off" condition, making the device unusable.

In some embodiments, the printing process involves using a substrate holder to position the substrate for printing. The present disclosure relates to a substrate holder, or a substrate holding system, which is configured to accurately and securely position and align a substrate for a printing process, for example an inkjet printing process. The present disclosure also describes a position monitoring system that can be used to detect the position of a print substrate and to drive actively controlling position and orientation of the substrate. The substrate holding system described herein has advantages over some other kinds of substrate holding systems in that the substrate holding system can be configured to dynamically reposition the substrate, once the substrate has been "gripped" to the holding system, without releasing and reestablishing the "grip" of the substrate holding system to the substrate. Use of the position monitoring system can enable closed-loop control of substrate position and orientation during processing, and the substrate holding system described herein minimizes unwanted substrate movement during movements of the substrate holder to position the substrate.

Figure 1:
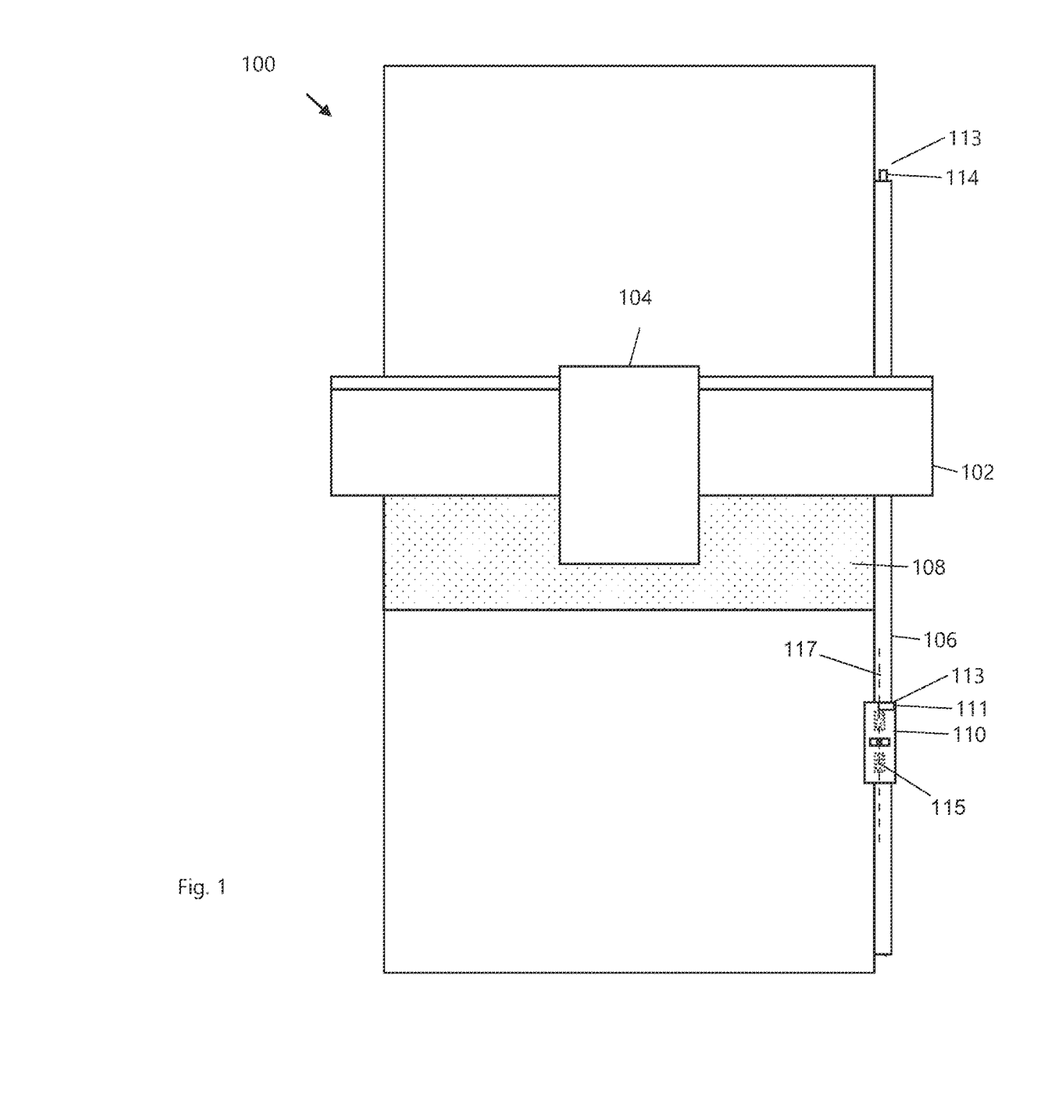
FIG. 1 is a top view of a printing system which incorporates a substrate holder with linear slide mechanism in accordance with some embodiments.

FIG. 1 is a top view of a printing system 100 which incorporates a substrate holding system 110 with linear slide mechanism 115 (shown schematically, in phantom). The substrate holding system 110 has a longitudinal axis 117, in this case, which is generally parallel with a transport direction of the substrate in the printing system 100 during processing. The linear slide mechanism 115 is oriented with a direction of linear displacement at an acute angle with the longitudinal axis 117 in a plane parallel to a contact surface of the substrate holding system 110, where a contact with a substrate is made. In some cases, the substrate holding system 110 may not have a longitudinal axis. In such cases, the linear slide mechanism 115 is oriented with a direction of linear displacement at an acute angle with the transport direction of the substrate.

The printing system 100 includes a substrate support 108 and a print support 102 which extends across the substrate support 108 of the printing system. The substrate support 108 generally uses a low friction medium to support a substrate. The low friction medium is a low viscosity material that is provided on a support surface of the substrate support 108. The low viscosity material may be a liquid or a gas, so the substrate support 108 may include a gas cushion system. Use of a gas minimizes friction, and thus minimizes energy needed to move the substrate along the substrate support 108. Use of a low viscosity liquid film to support the substrate generally causes more friction but can also dampen vibrations caused by non-aligned inertial moments.

The printing system 100 includes a print head 104 movably coupled to the print support 102. The print head 104 is configured to move along the print support 102 during the printing process. The substrate holding system 110 is coupled to a substrate holder support 106, which extends along and beside the substrate support 108 in a transportation direction of the substrate. The substrate is moved in the transport direction, along a longitudinal axis of the substrate support 108, which is generally parallel to the longitudinal axis 117 of the substrate holding system 110 in this case, during processing while the print head 104 is moved along the print support 102 in a direction transverse to the substrate transportation direction to deposit print material from the print head 104 at all desired locations on the substrate. The print support 102 and the substrate holder support 106 may be made of high-mass material, such as granite, that minimizes transmission of vibration to the print head 104 and/or the substrate holding system 110. The substrate holder support 106 is generally configured as a rail-like body that is as straight as possible to provide essentially linear movement of the substrate holding system 110 while a substrate is attached. The substrate holder support 106 and the substrate holding system 110 may have imperfections, however, that can cause deviation from linear movement leading to substrate positioning errors and printing errors.

The substrate holding system 110 includes a first component 111 of an optical positioning system 113. A second component 114 of the optical positioning system 113 is located at one end of the substrate holder support 106. The optical positioning system 113 uses an optical beam source and detector as a linear reference to correct movement and orientation of the substrate for accurate printing results. Here, the optical positioning system 113 includes a laser-based system wherein the first component (e.g., first component 111) comprises a reflector, for example a mirror, and the second component (e.g., second component 114) comprises a laser source and a detector. The second component 114, in this case, is attached to a relatively stationary reference location of the printing system 100. Here, that location is at a distal end of the substrate holder support 106. The location of the second component 114, comprising the laser source, is selected to provide sufficient optical path length between the first and second components 111 and 114 for a desired sensitivity in detecting position and rotation changes of the substrate holding system 110, and a substrate held thereby.

In this case, misalignment of the first component 111 indicates nonlinear motion of the substrate holding system 110 and the print substrate held by the substrate holding system 110 because misalignment of the first component 111 changes reflection of an incident optical beam, which can be detected by the detector of the second component 114. The misalignment can be due to position or rotation error of the substrate holding system 110, and the first component 111 can be disposed on the substrate holding system 110 at a location selected to respond to position error and rotation error in a desired way. The first component 111 thus generally represents the position and orientation of the substrate attached to the substrate holding system 110, and misalignment of the first component 111 indicates a change in position or orientation of the substrate that can be detected by the detector. Based on the change in position of the first component 111, corrective action can be undertaken to adjust position or orientation of the substrate for accurate printing.

The first component 111 may comprise a curved mirror wherein the curvature of the mirror is configured to reflect an incident optical beam, for example from the laser source of the second component 114, at an angle that changes with lateral displacement of the first component 111 in a direction transverse to the transport direction of the substrate. As lateral displacement of the substrate holding system 110 and the first component 111 changes, an optical beam from the second component 114 is reflected at a different angle from the curved mirror, resulting in a change in location of the reflected optical beam at the detector. The lateral displacement of the substrate holding system 110 can thus be detected by the detector such that action can be taken to correct the position of the substrate holding system 110.

The optical positioning system 113 may comprise a camera which records and registers positions of marks with respect to a reference point on the substrate holder support 106 such that the marks tracked by the camera reflect the position of the substrate holding system 110.

In some cases the optical positioning system 113 may have two laser sources and two detectors, or a combination of laser source, laser detector, mirror, and a camera system, in order to monitor alignment and position of the carriage (and, by extension, the substrate gripped thereby) during a printing process. Use of multiple independent measurements can improve distinction of linear and rotational movement of the substrate holding system 110. In one example, the optical positioning system 113 comprises a laser source, two laser detectors, and a beam splitter. The laser detectors are spaced apart, and the beam splitter is used to direct a portion of a beam from the laser source to each laser detector. Using two spaced-apart laser detectors, for example coupled to the substrate holding system 110, can register both linear displacement and rotational displacement of the substrate holding system 110 so that action can be taken to correct such displacements independently.

The substrate holding system 110 includes a contact member having a contact surface that removably attaches to a substrate and a carriage surface opposite from the contact surface. The substrate holding system 110 also has a carriage coupled to the carriage surface, the carriage having a direction of motion extending in a first direction, which is generally in the transportation direction of the substrate, and a base member having a longitudinal axis aligned with the first direction. The substrate holding system 110 also has a linear slide mechanism coupling the base member to the contact member, the linear slide mechanism oriented with a direction of linear displacement at an acute angle with the longitudinal axis in a plane parallel to the contact surface. The linear slide mechanism is shown in phantom in FIG. 1 as element 115. The linear slide mechanism is configured such that displacement of the linear slide mechanism results in linear displacement of the contact member in a direction transverse to the longitudinal axis and/or rotation of the contact member. The optical positioning system 113 can be used to detect position or rotation changes of the substrate holding system 110, as described above, and information gathered from the optical positioning system 113 can be used to drive operation of the linear slide mechanism to correct or adjust the orientation or position of a print substrate during a print process.

In one case, a print process on a print substrate is performed with the carriage held at a first orientation and information regarding position and orientation of the carriage and/or linear slide mechanisms thereon is recorded during the print process. During the print process, position and orientation of the substrate is detected and corrected dynamically using the apparatus and methods described herein to maximize print accuracy. The correction can be applied while material is being dispensed, or during a pause in the print process. For example, at a point during a printing process wherein a kerf or space between print regions on the print substrate is directly below the print head, the print process can be paused and position and/or orientation of the print substrate corrected to compensate for position error or misalignment of the print substrate. Such alignment corrections can also be performed during print head positioning processes while no printing is occurring.

A linear slide mechanism of a carriage is configured such that a direction of motion of a movable part of the linear slide mechanism is offset at an acute angle with respect to a first direction aligned with the direction of motion of the carriage along the substrate holding support and perpendicular to a second direction. The direction of motion of the movable part of the linear slide mechanism is within an x-y plane defined by the first direction and the second direction.

The linear slide mechanism is configured to translate a print substrate held against a contact surface of a contact member of the substrate holding system. The contact member of the substrate holding system is the surface which is directly against a top or bottom surface of the substrate. Holding force, for example suction, is applied to the substrate at the contact surface of the contact member to retain the substrate against the contact surface. The contact surface may have openings or a porous surface to facilitate application of suction at the contact surface. Gripping the substrate, in a suction embodiment, comprises applying suction through the openings in the contact surface. Ungripping, or releasing, the substrate comprises discontinuing section through the openings, and may comprise applying position pressure to prevent any "sticking" of the substrate to the contact surface.

Figure 2:
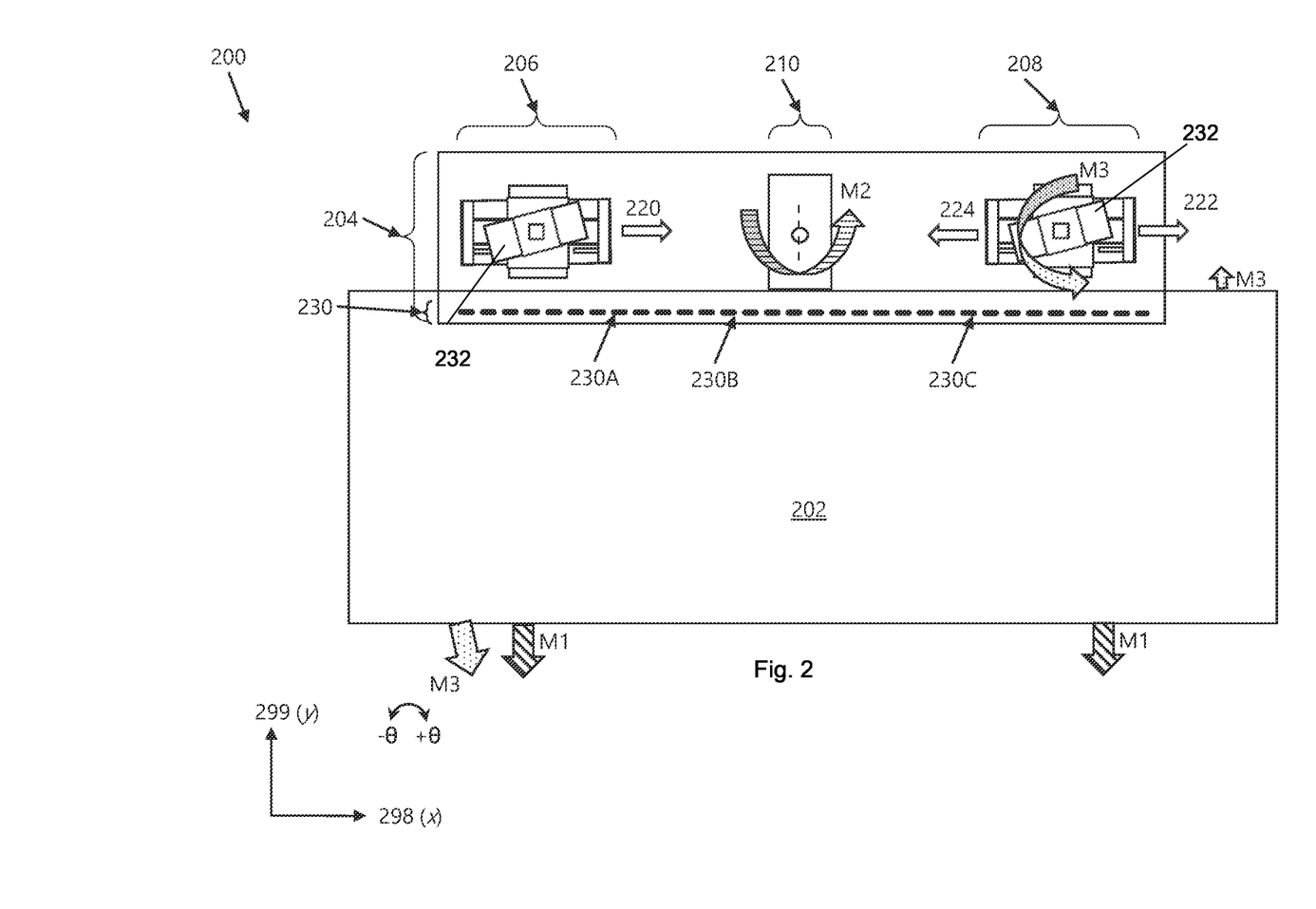
FIG. 2 is a schematic view of modes of motion of a substrate manipulated by a substrate holder having a linear slide mechanism, in accordance with some embodiments.

FIG. 2 is a schematic view of modes of motion of a substrate 202 manipulated by a substrate holder 200 having a linear slide mechanism, in accordance with some embodiments. The substrate holder 200 may be the substrate holding system 110 of FIG. 1. Substrate holder 200 includes a contact member 204 rotatably connected to a first linear slide mechanism 206 and to a second linear slide mechanism 208. The first and second linear slide mechanisms 206 and 208 are located on opposite sides of a center of the contact member 204, spaced apart along a first direction 298 aligned with a longitudinal axis of the contact member 204. In cases where the contact member 204 does not have a longitudinal axis, the first direction 298 is aligned with a transport direction of the substrate. The first and second linear slide mechanisms 206 and 208 may be adjacent to opposite ends of the contact member 204. The first direction 298 corresponds to the direction of motion of the substrate holder 200 along a substrate holder support as described in connection with FIG. 1 above. The contact member 204 is connected to each of the first and second linear slide mechanisms 206 and 208 in a way that allows the contact member 204 to rotate with respect to each linear slide mechanism.

The contact member 204 is also rotatably connected to a pivot member 210. Pivot member 210 is between the first linear slide mechanism 206 and the second linear slide mechanism 208. The pivot member 210 comprises a post (not shown in FIG. 2) disposed through a slot formed in the contact member 204 that extends in a second direction 299 perpendicular to the first direction 298. The first and second directions 298 and 299 are each parallel to the contact surface of the contact member 204, and define a plane parallel to the contact surface. The pivot member 210 allows the contact member to rotate and to move in the second direction 299 while substantially preventing motion of the contact member 204 in the first direction 298 relative to the pivot member 210.

Substrate 202 is releasably retained on the contact surface of the contact member 204 using a plurality of openings 230 which extend along one side of the contact member 204. Suction is applied to the flat surface of substrate 202 through the plurality of openings 230 before and during a print process performed on the substrate 202.

Substrate 202 undergoes a first mode of motion M1, which is translation along the second direction 299. In the discussion below, arrows indicate the direction and modes of motion of portions of substrate 202. Each arrow corresponding to the direction of motion of a portion of the substrate nearest to the arrow is patterned to indicate commonality with other arrows corresponding to the same mode of motion. A magnitude of the motion in the indicated direction is roughly indicated by the size of the arrow. The arrows are for illustrative purposes, and do not represent precise dimensions or directions of the motion. Translation of the substrate along second direction 299 can also include a component of motion along the first direction 298. The component of motion along the first direction 298 may be compensated for by motion of carriage along the first direction 298.

The first mode of motion M1 is achieved by moving a movable portion of the first linear slide mechanism 206 and the second linear slide mechanism 208 in identical ways. The movable portion of linear slide mechanism 206 is moved along a first vector 220 and the movable portion of the linear slide mechanism to generate is moved along a second vector 222, where the first and second vectors are of the same magnitude and direction generally parallel to the first direction 298, which is generally parallel to the transport direction of the substrate 202. The movable portion is an actuator, or is moved by an actuator, that is a linear actuator oriented with linear displacement in the first direction 298. A slide member 232 is slidably coupled to the moveable portion at an acute angle in a plane parallel with the plane of the contact surface of the contact member 204. Here, the movable portion of each slide mechanism 206 and 208 has a guide portion, which is located under a respective slide member 232, and is therefore not visible in FIG. 2. Each slide member 232, in this case, is a sleeve-shaped member, and each guide portion has a block-shaped member which can nest with the sleeve-shaped slide member 232 to slide along the slide member 232 in a direction that forms an acute angle to the transport direction of the substrate and/or the first direction 298. As the movable portion is moved, the slide member 232 slides along the movable portion, and the angled orientation of the slide member 232 translates the movement of the movable portion into a perpendicular movement of the slide member 232 by co-operation with the pivot member 210, which constrains the slide member 232 to move only in the second direction 299. Where both linear slide mechanisms 206 and 208 are operated the same, such operation results in movement of the contact member 204 according to the first mode M1.

The second mode of motion M2 is achieved by moving the movable portion of the first linear slide mechanism 206 along first vector 220 and the movable portion of the second linear slide mechanism 208 along third vector 224, so the first and second movable portions move toward each other. Such movement results in rotational motion about an axis located between the first linear slide mechanism 206 and the second linear slide mechanism 208. In FIG. 2, second mode of motion M2 corresponds with rotational motion about a center of the pivot member 210.

The third mode of motion M3 is achieved by moving the movable portion of the first linear slide mechanism 206 along the first vector 220 and holding the second linear slide mechanism 208 still during the motion of the first linear slide mechanism 206. Thus, the third mode of motion M3 results in rotational motion of the contact member 204 about a center point located within the second linear slide mechanism 208, the nonmoving linear slide mechanism. A similar mode of motion can be achieved by moving the movable portion of the second linear slide mechanism 208 along the second vector 222 or the third vector 224, while holding the first linear slide mechanism 206 still, in which case the contact member 204 will rotate about a center point located with the first linear slide mechanism 206. Any of the varieties of the second and third modes of motion M2 and M3 result in rotation of the substrate.

The modes of motion described above are reversed by reversing the direction of motion of each linear slide mechanism applied during the initial translation or rotation of substrate 202. Thus, rotations are possible in both the +θ and the −θ direction. Likewise, lateral movement is possible in the +y and −y direction.

Figure 3:
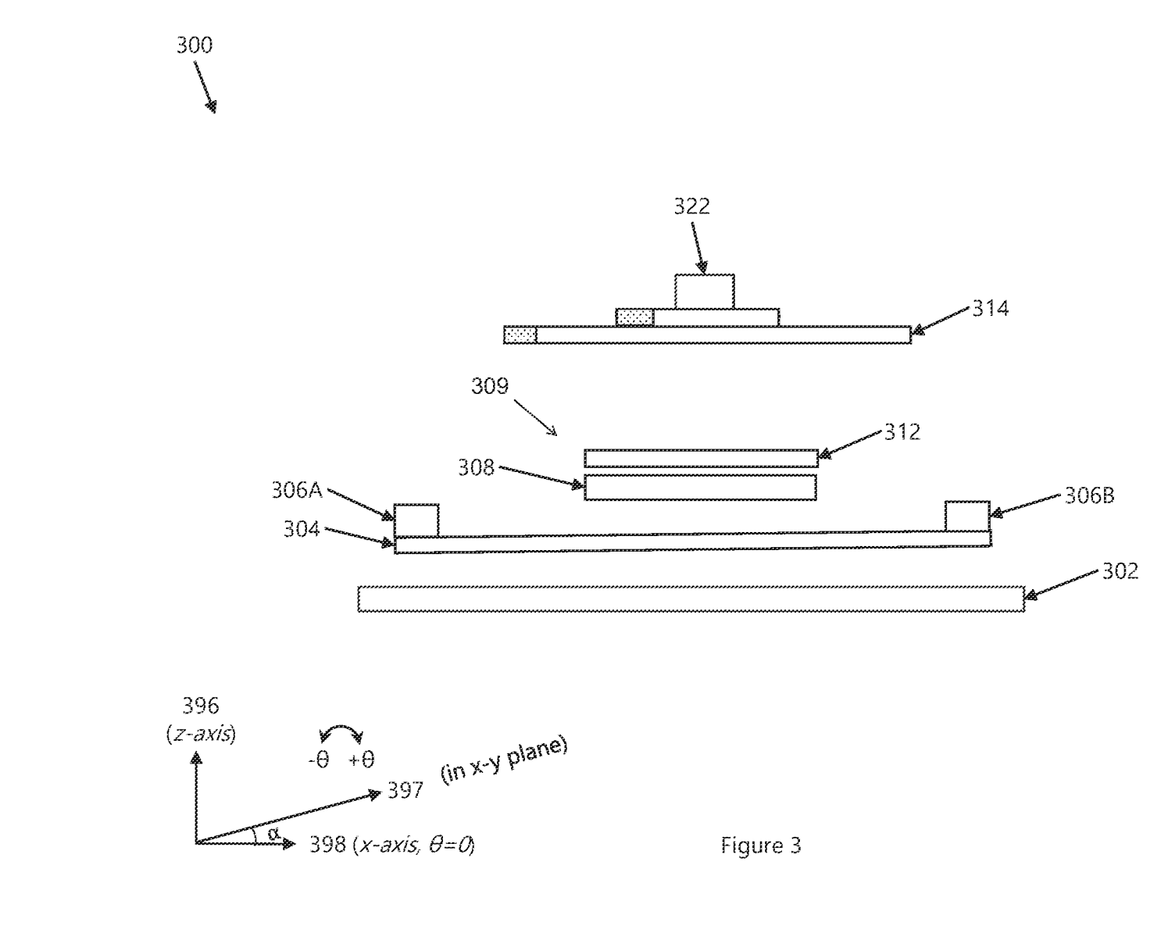
FIG. 3 is an exploded side view of a linear slide mechanism for a substrate holder, in accordance with some embodiments.

FIG. 3 is an exploded side view of a linear slide mechanism 300, in accordance with some embodiments. The linear slide mechanism 300 can be used as the first linear slide mechanism 206 and the second linear slide mechanism 208 in FIG. 2, and as a linear slide mechanism 115 in FIG. 1. The linear slide mechanism 300 has a base member 302. A track 304 is attached to the base member 302 to constrain motion of a linearly moveable member along the longitudinal axis of the base member 302. The base member 302 may have a longitudinal axis aligned with the track, or oriented in another direction. Limiters 306A and 306B may be attached at opposite ends of the track 304 to prevent unwanted motion of the linear slide mechanism 300. The base member 302 may be, or may be part of, a carriage for a substrate holding system such as the substrate holding system 110.

A slide member 309 is slidably coupled to the track 304 such that the slide member 309 moves along the track 304. The slide member 309 has a first coupling member 308 and a second coupling member 312. The first coupling member 308 couples to the track 304 and slides along the track 304. The second coupling member 312 is attached to the first coupling member 308 and is carried along with motion of the first coupling member 308 along the track 304. The second coupling member 312 is oriented at an angle α with respect to the first coupling member 308, and thus defines the acute angle of the linear slide mechanism 300.

A second slide member 314 is slidably coupled to the second coupling member 312. The second coupling member 312 couples the second slide member 314 with the first coupling member 308. The second slide member 314 is generally sleeve-shaped, and the second coupling member 312 is generally block-shaped or bar-shaped. The second slide member 314 partially wraps around the second coupling member 312, which nests with the second slide member 314 and slides along the second coupling member 312. A fastener 322 attaches the second slide member 314 to a contact member of a substrate holder, such as the contact member 204 of the substrate holder 200. As described in connection with FIG. 2, the contact member 204 is constrained to move only laterally (i.e. perpendicular to the extension direction of the track 304) and rotationally by the pivot member 210, so movement of the first slide member 309 in a first direction 398 slides the second coupling member 312 along the second slide member 314. Because the second slide member 314 is fastened to the contact member (e.g. 204), and the contact member is prevented from moving in the longitudinal direction by the pivot member, the angle of the second coupling member 312 translates the longitudinal motion of the first slide member 309 in the first direction 398 into perpendicular motion of the second slide member 314 and the contact member in a second direction 396 perpendicular to the first direction 398. The magnitude of the angle α results in a distance divisor that relates distance traveled in the second direction 396 to slide distance in the first direction 398.

Figure 4:
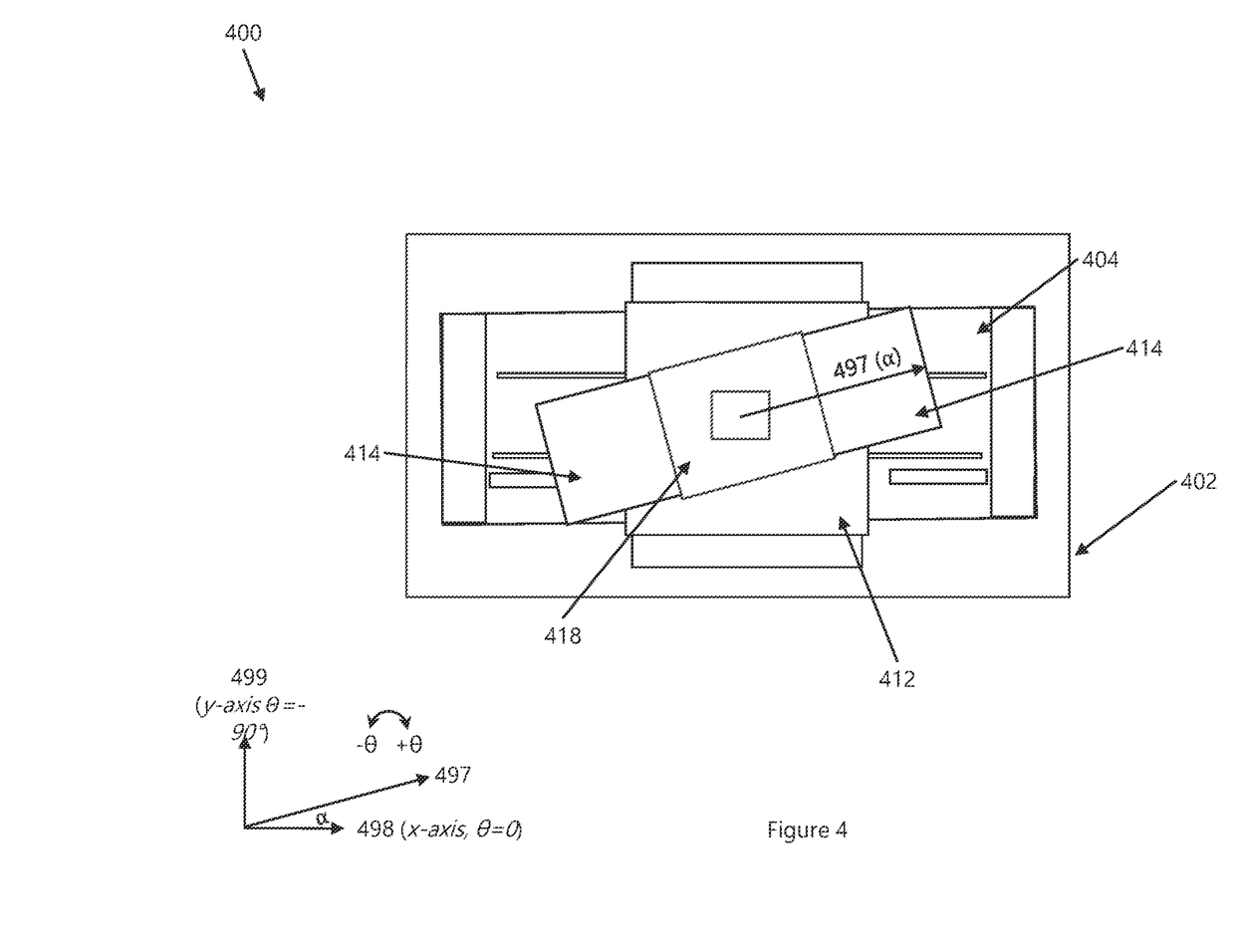
FIG. 4 is a side view of a linear slide mechanism, in accordance with some embodiments.

FIG. 4 is a top view of a linear slide mechanism 400 in accordance with some embodiments. The linear slide mechanism 400 has the same basic features as the linear slide mechanisms 300, 206, 208, and 115, with some slight differences. The linear slide mechanism 400 has an angled slide member 414 that is slidably coupled to a base slide member 412, which in turn is slidably coupled to a track 404 oriented along the longitudinal axis of a base member 402. Note that using a base member with a longitudinal axis, or with a longitudinal axis aligned with the track 404, is optional. For example, the base member 402 could be circular. The angled slide member 414 is oriented at an acute angle α with respect to the longitudinal direction (or the track direction), denoted by direction 498. The angle α defines the length of movement in the lateral direction 499 per length of movement in the longitudinal direction 498.

A coupling member 418 is slidably coupled to the angled slide member 414. As the base slide member 412 moves a distance x in the longitudinal direction 498, because the coupling member 418 is fastened to the contact member (e.g. 204), which is constrained from moving in the longitudinal direction 498 by the pivot member 210 (FIG. 2), movement of the coupling member 418 along the angled slide member 414 translates the movement of the base slide member 412 by a distance x into perpendicular movement of the coupling member 418 a distance xsin(α) along the lateral direction 499. In this case, the angled slide member 414 nests with the coupling member 418 for sliding motion like the members 312 and 314 of FIG. 3.

It should be noted that the lateral motion generated by motion of movable member of the linear slide mechanisms described herein can be perpendicular to the motion of the movable member, or can be transverse but not perpendicular depending on the orientation of the slot formed in the contact member through which the pivot member projects. Referring again to FIG. 2, the slot is illustrated by phantom line 260, shown extending in a direction perpendicular to the transport direction of the substrate, generally parallel to the first direction 298. Movement of the contact member 204 is constrained by the direction of the slot, so movement of the movable portions of the linear slide mechanisms 206 and 208 moves the contact member 204 in the direction of the slot, whatever direction that is, so long as the slot is linear.

The linear slide mechanisms 115, 206, 208, 300, and 400 add stiffness to the substrate holding system 110 (FIG. 1). The smaller the angle α, the stiffer the substrate holding system 110 is. Greater stiffness suppresses unwanted vibrational oscillations and reactions of the substrate holding system 110 when attached to the substrate. While larger angles α provide greater range of motion, both laterally and rotationally, larger angles α also reduce stiffness and can introduce unwanted movement of the system in response to movements of the substrate. The angle α is generally between about 1 degree and about 30 degrees, such as between about 2 degrees and about 15 degrees. In most cases, an angle α between about 3 degrees and about 10 degrees, such as about 5 degrees, 7 degrees, or 9 degrees can offer a suitable combination of range of motion and stiffness. The amount of stiffness needed can depend on the mass and geometry of the substrate to be processed.

Figure 5:
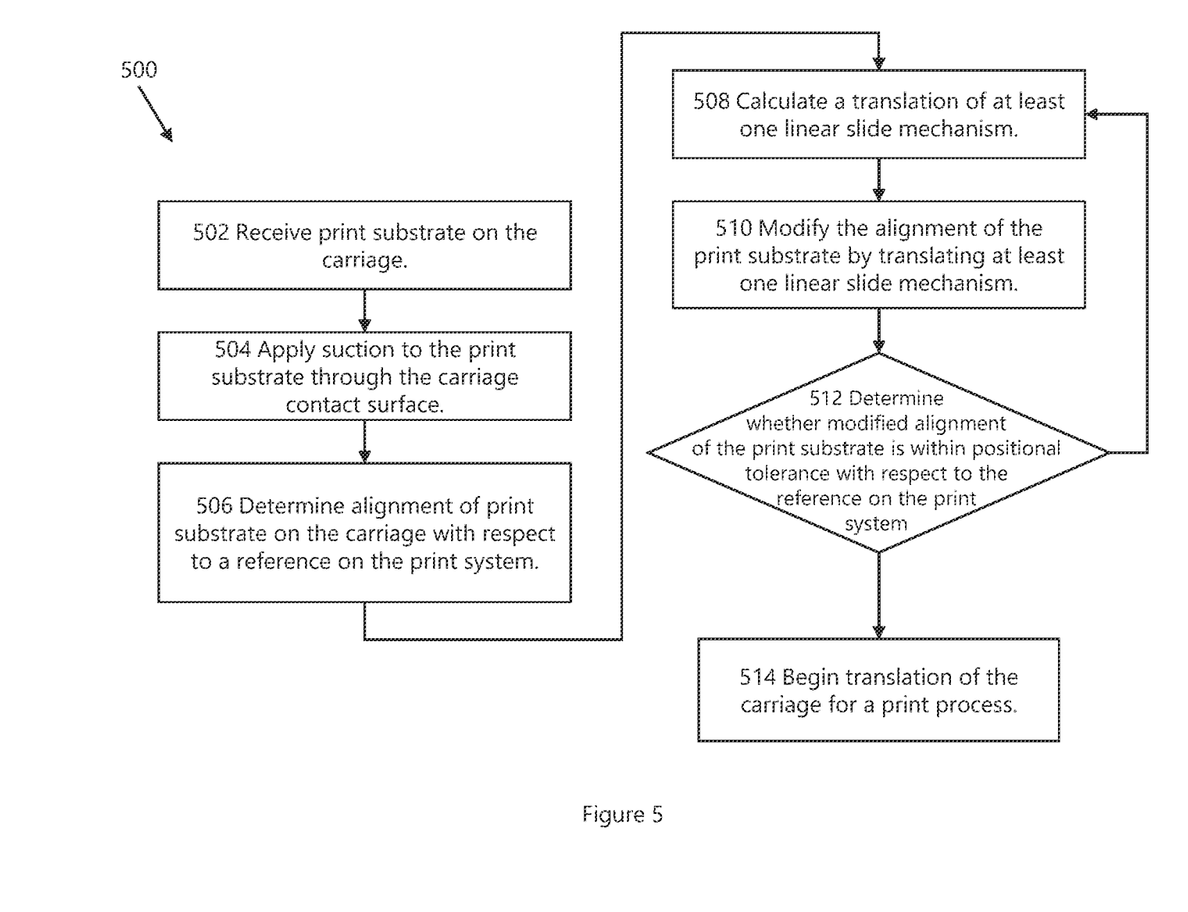
FIG. 5 is a flow diagram of a method of handling a substrate, in accordance with some embodiments.

FIG. 5 is a flow diagram of a method 500 of handling a substrate, in accordance with some embodiments.

Method 500 includes operations related to a method 500 of handling a print substrate during a printing process, in accordance with some embodiments.

Method 500 includes an operation 502, wherein a print substrate is received on a printing system and placed in proximity to the carriage, or, more precisely, in proximity to a contact surface of a contact number of the carriage.

Method 500 includes an operation 504, wherein suction is applied to the print substrate through openings in a contact surface of the contact member the carriage.

Method 500 includes an operation 506, wherein an alignment of the print substrate is determined after ripping the print substrate. Alignment of the print substrate is determined with respect to a reference of the print system. According to some embodiments, alignment is determined using an optical positioning system as described above in the discussion of FIG. 1.

Method 500 a includes an operation 508, wherein translation of at least one linear slide mechanism, or a part of the linear slide mechanism, is calculated, in order to align the print substrate with respect to the reference of the print system.

Method 500 includes an operation 510, whereby the print substrate is aligned by translating at least one movable portion of a linear slide mechanism.

Method 500 includes an operation 512, wherein the print system determines whether modify alignment of the print substrate is within tolerances for the print substrate position respect to the reference of the print system. Upon determining that the print substrate is within tolerance for the print substrate position, the method proceeds to operation 514. Upon determining that the print substrate is outside tolerances for the print substrate position, the method proceeds to operation 508.

Method 500 includes an operation 514, wherein translation of the carriage begins for the print process.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A substrate holder, comprising:
   a contact member having a contact surface and a carriage surface opposite from the contact surface; and
   a carriage coupled to the carriage surface, the carriage having a direction of motion extending in a first direction, and comprising:
   a base member; and
   a linear slide mechanism coupling the base member to the contact member, the linear slide mechanism oriented with a direction of linear displacement at an acute angle with the first direction in a plane parallel to the contact surface.

2. The substrate holder of claim 1, wherein the base member comprises a track and wherein the linear slide mechanism comprises a slide member coupled to the track.

3. The substrate holder of claim 2, wherein the track is oriented parallel to the first direction and the slide member defines the acute angle with respect to the first direction.

4. The substrate holder of claim 3, wherein the slide member is a first slide member, and the linear slide mechanism further comprises a second slide member slidably coupled to the first slide member and to the carriage surface.

5. The substrate holder of claim 4, wherein the base member is a first base member, the linear slide mechanism is a first linear slide mechanism, and the acute angle is a first acute angle, and the carriage further comprises:
a second base member; and
a second linear slide mechanism coupling the second base member to the contact member, the second linear slide mechanism oriented with a linear displacement that forms a second acute angle with the first direction in the plane parallel to the contact surface.

6. The substrate holder of claim 5, wherein the second acute angle is substantially equal to the first acute angle.

7. The substrate holder of claim 6, wherein the first linear slide mechanism and the second linear slide mechanism are independently movable.

8. The substrate holder of claim 7, further comprising a first actuator coupled to the first linear slide mechanism and a second actuator coupled to the second linear slide mechanism.

9. The substrate holder of claim 8, wherein each of the first and the second actuator is a chain actuator.

10. The substrate holder of claim 5, wherein the second acute angle is offset from the first acute angle.

11. An inkjet printer, comprising:
a substrate support with a flat support surface;
a print support disposed across the support surface;
a printhead coupled to the print support; and
a substrate holder disposed at a side of the support surface, the substrate holder comprising:
a contact member having a contact surface and a carriage surface opposite from the contact surface; and
a carriage coupled to the carriage surface, the carriage comprising:
a base member having a longitudinal axis; and
a linear slide mechanism coupling the base member to the contact member, the linear slide mechanism oriented with a linear displacement that forms an acute angle with the longitudinal axis in a plane parallel to the contact surface.

12. The inkjet printer of claim 11, wherein the carriage comprises a gas float system.

13. The inkjet printer of claim 12, further comprising a rail disposed at the side of the support surface, wherein the gas float system of the carriage can move the substrate holder along the rail.

14. The inkjet printer of claim 11, wherein the substrate holder can move a substrate along the support surface in a direction parallel to the side of the support surface, and the linear slide mechanism can move the substrate in a direction perpendicular to the side of the support surface.

15. The inkjet printer of claim 14, wherein the linear slide mechanism can rotate the substrate.

16. The inkjet printer of claim 15, wherein the linear slide mechanism can rotate the substrate about a center of the carriage.

17. The inkjet printer of claim 15, wherein the linear slide mechanism can rotate the substrate about a centerpoint substantially over the linear slide mechanism.

18. The inkjet printer of claim 15, wherein the linear slide mechanism is configured to perform simultaneous rotational and translational motion of the substrate.

19. A substrate holder, comprising:
a contact member having a contact surface and a carriage surface opposite from the contact surface; and
a carriage coupled to the carriage surface, the carriage having a direction of motion extending in a first direction, and comprising:
a base member;
a first linear slide mechanism and a second linear slide mechanism, the first and second linear slide mechanisms coupling the base member to the contact member at opposite ends of the contact member, each of the first and second linear slide mechanisms oriented with a direction of linear displacement at an acute angle with the first direction in a plane parallel to the contact surface.

20. The substrate holder of claim 19, further comprising a pivot member located between the first and second linear slide mechanisms.

* * * * *